US012680530B1

(12) United States Patent
Moore

(10) Patent No.: US 12,680,530 B1
(45) Date of Patent: Jul. 14, 2026

(54) SYSTEM AND METHOD FOR CONVERTING POTENTIAL ENERGY INTO KINETIC ENERGY USING BUOYANCY

(71) Applicant: Roger Wayne Moore, Boynton Beach, FL (US)

(72) Inventor: Roger Wayne Moore, Boynton Beach, FL (US)

( * ) Notice: Subject to any disclaimer, the term of this patent is extended or adjusted under 35 U.S.C. 154(b) by 0 days.

(21) Appl. No.: 19/223,775

(22) Filed: May 30, 2025

Related U.S. Application Data

(60) Provisional application No. 63/655,165, filed on Jun. 3, 2024.

(51) Int. Cl.
*F03B 17/04* (2006.01)

(52) U.S. Cl.
CPC .......... *F03B 17/04* (2013.01); *F05B 2210/11* (2013.01); *F05B 2220/706* (2013.01)

(58) Field of Classification Search
CPC . F03B 17/04; F05B 2210/11; F05B 2220/706
See application file for complete search history.

(56) References Cited

U.S. PATENT DOCUMENTS 3,857,242 A * 12/1974 Gilmore .................. F03B 17/04 60/495
4,254,622 A * 3/1981 Denson, Sr. ............ F03B 17/02 60/496
8,015,807 B1 * 9/2011 Akutsu ................... F03B 17/02 290/1 R
8,112,992 B2 * 2/2012 Pirincci ................... F03B 17/04 60/495
8,756,932 B2 * 6/2014 Pirincci ................... F03B 17/04 60/495
10,465,649 B2 * 11/2019 Akbayr ................... F03B 17/02
10,584,687 B2 * 3/2020 Filloramo ............... F03B 17/04
10,774,819 B2 * 9/2020 Townsend, IV ........ F03B 17/04
11,333,125 B2 * 5/2022 Filloramo ............... F03G 7/104
2005/0127681 A1 * 6/2005 Shaochun ............... F03B 17/02 290/54
2008/0042601 A1 2/2008 Blevins
2010/0107627 A1 5/2010 Morgan
2010/0109329 A1 5/2010 Brantingham
(Continued)

FOREIGN PATENT DOCUMENTS

WO WO2022214156 A1 10/2022

*Primary Examiner* — Jesse S Bogue
(74) *Attorney, Agent, or Firm* — John Rizvi; John Rizvi, P.A.—The Patent Professor®

(57) ABSTRACT

A system and method for converting potential energy into kinetic energy includes a water body and a water column extending upward from the water body. A buoyant body is shaped and sized to float through the water column from an underwater, bottom end of the water column to a top end of the water column to acquire potential energy. A hoist mechanism is configured to seize the buoyant body at or near the top end of the water column, transport the buoyant body away from the water column, and allow the buoyant body to fall with the cable connected to the buoyant body via the securing member, thereby pulling on the cable and causing a generator shaft to rotate. A transport mechanism engages the buoyant body and carries the fallen, buoyant body to the bottom end of the water column, to begin a subsequent cycle of operation.

18 Claims, 6 Drawing Sheets

(56) References Cited

U.S. PATENT DOCUMENTS

| | | | | |
|---|---|---|---|---|
| 2010/0180587 | A1 | 7/2010 | Manakkattupadeettathil | |
| 2013/0168970 | A1 * | 7/2013 | Grossman | F03B 17/04 290/1 A |
| 2014/0265340 | A1 | 9/2014 | Hwang et al. | |
| 2017/0085155 | A1 | 3/2017 | Hwang et al. | |
| 2020/0040875 | A1 * | 2/2020 | Chase | F03G 7/00 |
| 2021/0363957 | A1 | 11/2021 | Che | |

* cited by examiner

SYSTEM AND METHOD FOR CONVERTING POTENTIAL ENERGY INTO KINETIC ENERGY USING BUOYANCY

CROSS-REFERENCE TO RELATED APPLICATIONS

This application claims the benefit of U.S. Provisional Patent Application No. 63/655,165, filed on Jun. 3, 2024, which is incorporated herein by reference in its entirety.

FIELD OF THE INVENTION

The present invention relates generally to kinetic energy generation, and more particularly, to a system and method for converting potential energy of a buoyant body into kinetic energy at a generator shaft, the conversion taking place by cyclically allowing the buoyant body to float upward in water and acquire potential energy, and allowing the buoyant body to fall outside of the water and thereby pull on a cable which rotates the generator shaft.

BACKGROUND OF THE INVENTION

In the modern era, electricity has become the lifeblood of human civilization, powering industries, illuminating cities, and fueling technological advancements that shape society's present and future. However, the methods by which electricity is generated have come under increasing scrutiny due to their detrimental impact on the environment and human health. The reliance on fossil fuels, such as coal, oil, and natural gas, has led to a host of environmental challenges, including air and water pollution, greenhouse gas emissions, and climate change. In response to these pressing concerns, there is an urgent need for a paradigm shift towards "green" energy systems that can generate electricity in an environmentally sustainable manner.

The imperative for green energy arises from the intersecting crises of climate change, environmental degradation, and energy insecurity. Climate change, driven primarily by the combustion of fossil fuels and deforestation, is viewed by a majority of experts as posing an existential threat to life on Earth. Rising global temperatures, melting ice caps, more frequent extreme weather events, and disruptions to ecosystems are already manifesting, with profound implications for human societies. Transitioning to green energy is essential to mitigate the worst impacts of climate change and safeguard the planet for future generations.

Furthermore, the environmental costs associated with conventional energy sources are increasingly evident. Air pollution from burning fossil fuels contributes to respiratory diseases, cardiovascular problems, and premature deaths, particularly affecting vulnerable communities living near power plants and industrial facilities. Water pollution from mining and drilling operations contaminates freshwater sources, endangering aquatic ecosystems and jeopardizing human health. The extraction and transportation of fossil fuels also pose risks of spills, leaks, and accidents, with devastating consequences for local environments and communities.

The shift toward green energy is not merely an environmental or economic imperative but also a present, technological trend. Advances in renewable energy technologies have made them increasingly competitive with fossil fuels in terms of cost, efficiency, and scalability. Solar photovoltaic and wind power, in particular, have experienced exponential growth in deployment and cost reductions, reaching grid parity or even surpassing the affordability of traditional energy sources in many regions. Moreover, innovations in energy storage, smart grids, and digitalization are enhancing the reliability and flexibility of renewable energy systems, overcoming the intermittency challenges inherent in solar and wind power.

Despite these promising developments, significant barriers remain to the widespread adoption of green energy. These include policy inertia, vested interests in the fossil fuel industry, inadequate infrastructure and financing, and societal resistance to change. Overcoming these barriers will require a concerted effort by governments, businesses, civil society, and individuals to prioritize sustainability, invest in renewable energy projects, enact supportive policies and regulations, and raise awareness about the benefits of green energy. Among other key factors, promoting cost-effectiveness of green energy systems may allow to more swiftly advance green energy implantation in society.

Accordingly, there is an established need for a solution to at least one of the aforementioned problems. For example, there is a permanent need for advancements in cost-effective green energy generation, i.e. energy systems which may successfully generate energy at reasonable cost without having to rely on fossil fuel consumption to do so.

SUMMARY OF THE INVENTION

The present invention is directed to a system and method for converting potential energy into kinetic energy, which may be used to generate electricity, movement, or for other purposes. The method may include repeating a cycle of operation, i.e. may be cyclical. The system includes a water body and a water column extending upward from the water body. A set of valves may be positioned along the water column and may hold the water column in place, i.e. protruding upward from the water body. A buoyant body is shaped and sized to float through the water column from an underwater, bottom end of the water column to a top end of the water column to acquire potential energy. A hoist mechanism is configured to seize the buoyant body at or near the top end of the water column, transport the buoyant body away from the water column, and allow the buoyant body to fall with the cable connected to the buoyant body, thereby pulling on the cable and causing a generator shaft to rotate. A transport mechanism may engage the buoyant body and carry the fallen, buoyant body to the bottom end of the water column, to begin a subsequent cycle of operation.

In a first implementation of the present invention, a system for converting potential energy into kinetic energy may include:

- a water body;
- a water column, extending upward from a surface level of the water body, the water column comprising an underwater, bottom end arranged within the water body and a top end arranged above the surface level of the water body;
- a buoyant body, shaped and sized to float through the water column from the bottom end of the water column to the top end of the water column to acquire potential energy;
- a hoist mechanism, comprising a cable and a securing member carried by the cable, the securing member configured to seize the buoyant body at a first position at or near the top end of the water column, transport the buoyant body from the first position to a second position away from the water column, and allow the buoyant body to fall from said second position to a third position due to gravity with the cable connected to the buoyant body via the securing member;

a generator shaft, rotatable by a pulling of the cable of the hoist mechanism; and a transport mechanism, comprising a securing member configured to engage the buoyant body and carry the buoyant body from the third position to the bottom end of the water column, and further configured to disengage the buoyant body at said bottom end of the water column.

In a second aspect, the system may include a set of valves configured to hold the water column in place with respect to the water body.

In another aspect, the first position may be arranged near, and elevated from, the top end of the water column. The system may include a lifting mechanism configured to lift the buoyant body out of the water column, from the top end of the water column to the first position.

In a second implementation of the present invention, a method for converting potential energy into kinetic energy may include the steps of:

providing a system comprising:

a water body, a water column, extending upward from a surface level of the water body, the water column comprising an underwater, bottom end arranged within the water body and a top end arranged above the surface level of the water body, a buoyant body, shaped and sized to float through the water column from the bottom end of the water column to the top end of the water column, a hoist mechanism, comprising a cable and a securing member carried by the cable, the securing member configured to selectively engage and disengage the buoyant body, a generator shaft, and a transport mechanism, comprising a securing member configured to selectively engage and disengage the buoyant body;

allowing the buoyant body to float through the water column from the bottom end of the water column to the top end of the water column to acquire potential energy;

engaging the securing member of the hoist mechanism to the buoyant body at a first position at or near the top end of the water column;

transporting the buoyant body, using the hoist mechanism, from the first position to a second position away from the water column;

allowing the buoyant body to fall from said second position to a third position due to gravity with the cable connected to the buoyant body via the securing member such that a pulling force is exerted by the buoyant body on the cable;

transmitting at least part of said pulling force to the generator shaft via the cable, thereby causing the generator shaft to rotate;

disengaging the securing member of the hoist mechanism from the buoyant body at the third position;

engaging the securing member of the transport mechanism to the buoyant body and carrying the buoyant body from the third position to the bottom end of the water column; and disengaging the securing member of the transport mechanism from the buoyant body at the bottom end of the water column.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
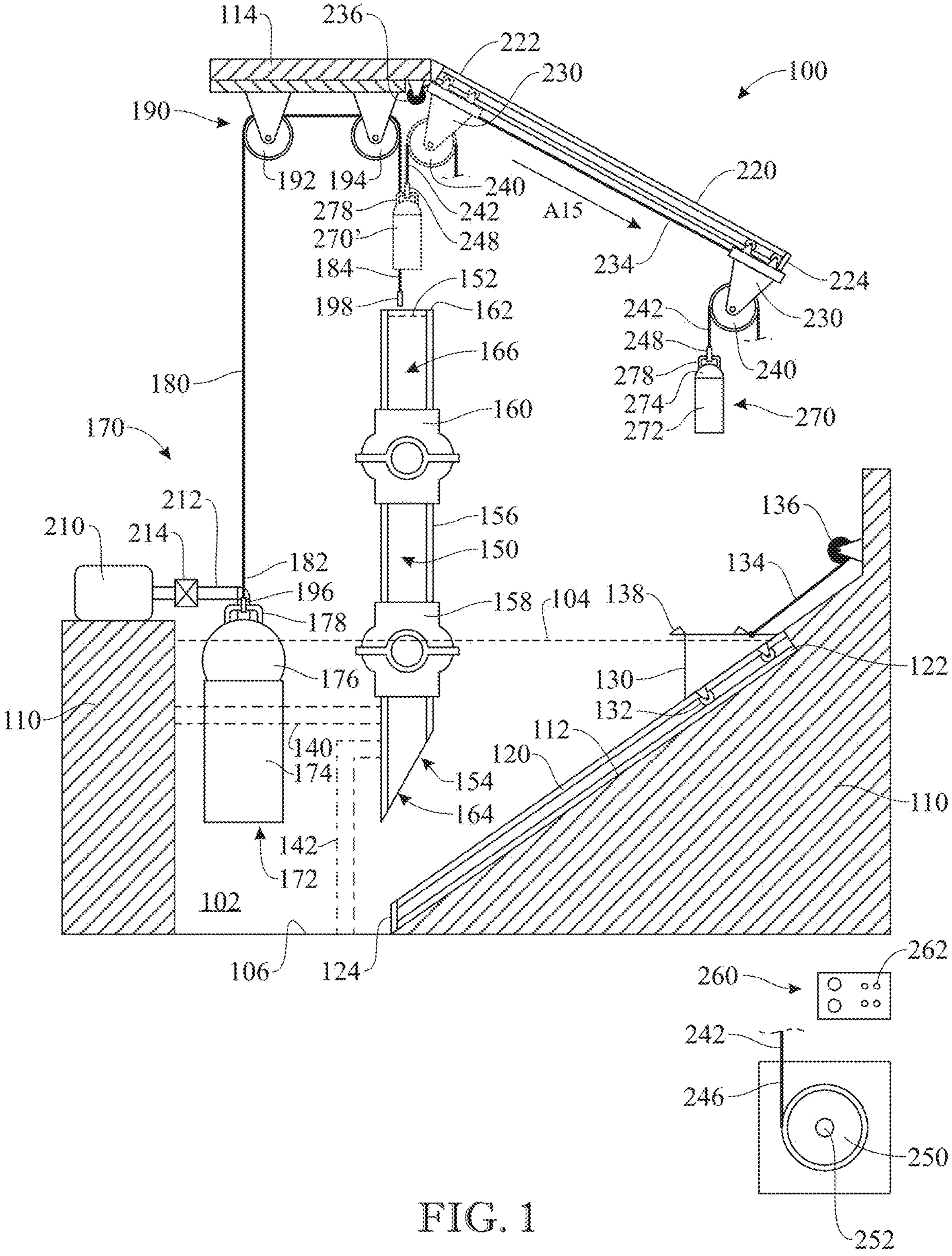
FIG. 1 presents a front elevation view of a system for converting potential energy into kinetic energy in accordance with an illustrative embodiment of the present invention, the view showing a first phase of a method for converting potential energy into kinetic energy in accordance with an illustrative embodiment of the present invention.

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a system and method for converting potential energy into kinetic energy. Shown throughout the figures is an illustrative embodiment of the system, shown executing an illustrative embodiment of the method of the present invention. The system for converting potential energy into kinetic energy shown in the drawings is hereinafter referred to as system 100.

Referring initially to FIG. 1, the system 100 includes a body of water 102 and a structure 110 arranged adjacent to the body of water 102. For instance and without limitation, the body of water 102 may be a pool and the structure 110 may include a pool structure defining the pool. The structure 110 may include a sloped wall 112, which may face or define the body of water 102, i.e. may define a boundary of the body of water 102. A first rail system 120 may be secured to the sloped wall 112. The first rail system 120 may extend from a first or top end 122 to a second or bottom end 124 thereof. The top end 122 of the first rail system 120 may be located at or near a water surface level 104 of the body of water 102. In turn, the bottom end 124 of the first rail system 120 may be positioned below water surface level 104, such as, but not limited to, at or near a bottom of the body of water 102.

A first carriage 130 may be operatively engaged with the first rail system 120, forming a transport mechanism. The first carriage 130 is configured to travel along the first rail system 120 both upward and downward. The first carriage 130 may roll on, slide on, slide along, or be otherwise guided by the first rail system 120. For instance and without limitation, the first carriage 130 depicted herein comprises a set of wheels 132 configured to roll on the sloped wall 112 as the first carriage 130 is guided by the first rail system 120. The first carriage 130 is denser than water and configured to travel downward along the first rail system 120 due to gravity.

The first carriage 130 is connected to a cable 134, which, in turn, is connected to and configured to wind on, and unwind from, a drum 136. The drum 136 may be mounted to a fixed position, such as to an area of the structure 110 arranged adjacent to the sloped wall 112, above water surface level 104. The drum 136 is configured to selectively wind the cable 134 thereon, to cause the first carriage 130 to travel upward along the first rail system 120, or alternatively allow the cable 134 to unwind therefrom, permitting the first carriage 130 to travel downward along the first rail system 120. For instance, in some embodiments, the drum 136 may include a torsion spring selectively engageable with a shaft of the drum 136 such that, when the torsion spring engages the shaft, the drum 136 is spring-biased by the torsion spring to rotate in the winding direction, whereas, when the torsion spring does not engage the shaft, the drum 136 is free to rotate in the unwinding direction. As further shown, the first carriage 130 may further include one or more clasps 138, locks, latches, or other actuatable securing members, hereinafter referred to as clasp 138, for purposes described hereinafter.

With continued reference to FIG. 1, the system 100 may include a water column 150, which may extend upward from the body of water 102 such that a top end 152 of the water column 150 is arranged above and spaced apart from the water surface level 104, and a bottom end 154 of the water column 150 is located at or, more preferably, below water surface level 104. The water column 150 may be contained within a tube, hereinafter referred to as buoyancy tube 156. The buoyancy tube 156 depicted herein rises vertically and contains the water column 150. The buoyancy tube 156 is generally fixed or non-movable with respect to the water body 102 and with respect to a floor 106 at the bottom of the water body 102. For instance, in some embodiments, the buoyancy tube 156 may be supported by the structure 110, such as by a supporting arm, beam, or the like (an example of an arm 140 being shown in phantom lines). In another non-limiting example, the buoyancy tube 156 may be attached to and supported by the floor 106 of the water body 102, such as by a post, pedestal, or the like (an example of a post 142 being shown in phantom lines). It should be noted that arm 140 and post 142 are omitted in FIGS. 2-6 so as not to obscure the present invention.

The buoyancy tube 156 may include a top end 162, a bottom end 164, and a longitudinal through bore 166 extending between the top and bottom ends 162 and 164. The top and bottom ends 162 and 164 may be permanently open, as shown; in other embodiments, one or both of the top and bottom ends 162 and 164 may be selectively openable and closeable, such as by a valve or lid. The buoyancy tube 156 is preferably filled with water generally in its entirety; i.e., the water column 150 preferably extends along the entirety of the buoyancy tube 156 from the bottom end 164 to the top end 162.

As further shown, the buoyancy tube 156 may include one or more valves, such as a first valve 158 and a second valve 160, arranged at different longitudinal positions along the buoyancy tube 156. The valves 158, 160 may be solenoid valves or other remotely operable valves. In a non-limiting example, the first valve 158 may be located near the water surface level 104 and the second valve 160 may be located a distance above the first valve 158. Each valve 158, 160 is operable to selectively open and close (i.e., block) the through bore 166 at the valve 158, 160, for purposes described hereinafter. For example, the illustration of FIG. 1 shows both valves 158, 160 arranged in a closed position.

The system 100 may further include a lifting mechanism 170, configured to selectively lift a load as will be described hereinafter. For instance, in some embodiments, the lifting mechanism 170 may comprise a weight assembly 172, a cable 180, and a set of pulleys 190. The set of pulleys 190 may include a first pulley 192 and a second pulley 194 arranged horizontally-spaced-apart with one another, thereby providing a horizontal component to the cable 180, which facilitates horizontally separating the lifting mechanism 170 from the buoyancy tube 156. The set of pulleys 190 may be attached to or otherwise carried by a ceiling or top wall 114 of the structure 110; for example, the first and second pulleys 192 and 194 of the present embodiment are secured to the top wall 114 and protrude downward from the top wall 114.

The cable 180 may extend around the set of pulleys 190, and more specifically, around the first and second pulleys 192, 194, such that a first end 182 of the cable 180 is suspended downward from the first pulley 192 and a second end 184 of the cable 180 is suspended downward from the second pulley 194 in horizontally-spaced-apart relationship with the first end 182 of the cable 180. The first end 182 of the cable 180 is attached to the weight assembly 172 such as by a first clasp 196 at first end 182 coupling with a ring 178 of the weight assembly 172. When attached, the weight assembly 172 is carried by or suspended from the first end 182 of the cable 180. In turn, a second clasp 198, lock, latch, or other actuatable securing member, hereinafter referred to as clasp 198, may be provided at the second end 184 of the cable 180 for purposes described hereinafter.

With continued reference to FIG. 1, the weight assembly 172 may include a weight 174 and an inflatable bladder or body 176. A ring 178 may extend from the inflatable body 176, for instance and without limitation. The weight 174 and inflatable body 176 may be configured in shape, sized, and construction (e.g., materials) such that, when the inflatable body 176 is deflated, the overall weight assembly 172 formed by the weight 174 and the (deflated) inflatable body 176 is denser than water and thus may sink within the body of water 102, and further such that, when the inflatable body 176 is inflated, the overall weight assembly 172 formed by the weight 174 and the (inflated) inflatable body 176 is less dense than water and thus may float within the body of water 102.

An air compressor or compressed air source 210, may be connected to the inflatable body 176 via a tubing or hose 212. In a non-limiting example, the compressed air source 210 may be electrically- or pneumatically-operated. The hose 212 may establish fluid communication from the compressed air source 210 to the inflatable body 176, allowing the inflatable body 176 to fill with pressurized air from the compressed air source 210. At least one valve 214 may be positioned at the compressed air source 210, the hose 212, or the inflatable body 176 and may be operable to regulate such fluid communication. For example, in some embodiments, the at least one valve 214 may be operable to allow fluid to flow from the compressed air source 210 to the inflatable body 176 to inflate the inflatable body 176. Alternatively or additionally, the at least one valve 214 may be operable to prevent fluid flow from the compressed air source 210 to the inflatable body 176 to inflate the inflatable body 176. Alternatively or additionally, the at least one valve 214 may be operable to allow pressurized air from the inflatable body 176 to be vented through the at least one valve 214, for deflating the inflatable body 176. In a non-limiting example, the at least one valve 214 may include one or more remotely operable, solenoid valves.

As shown in the figure, the system 100 may further include a second rail system 220, which may be sloped downward. For instance, the second rail system 220 may be attached to a sloped portion (not shown) of the top wall 114 of the structure 110, which may be similar to the downward-sloped wall 112 of the structure 110. The second rail system 220 may extend from a first or top end 222 to a second or bottom end 224 thereof. The top end 222 of the second rail system 220 may be located adjacent to the set of pulleys 190, and more specifically, to the second pulley 194. In turn, the bottom end 224 of the second rail system 220 may be positioned farther from the set of pulleys 190 than the top end 222, and more specifically, may be positioned generally vertically aligned with the top end 122 of the first rail system 120.

A second carriage 230 may be operatively engaged with the second rail system 220, forming a hoist mechanism. The second carriage 230 is configured to travel along the second rail system 220 both upward and downward. The second carriage 230 may roll on, slide on, slide along, or be otherwise guided by the second rail system 220. For instance and without limitation, the second carriage 230 depicted herein comprises a set of wheels 232 configured to roll on and be guided by the second rail system 220. The second carriage 230 may be configured to travel downward along the second rail system 220 due to gravity.

The second carriage 230 is connected to a cable 234, which, in turn, is connected to and configured to wind on, and unwind from, a drum 236. The drum 236 may be mounted to a fixed position, such as to the top wall 114 of the structure 110. The drum 236 is configured to selectively wind the cable 234 thereon, to cause the second carriage 230 to travel upward towards the set of pulleys 190 along the second rail system 220, or alternatively allow the cable 234 to unwind therefrom, permitting the second carriage 230 to travel downward along the second rail system 220. For instance, in some embodiments, the drum 236 may include a torsion spring selectively engageable with a shaft of the drum 236 such that, when the torsion spring engages the shaft, the drum 236 is spring-biased by the torsion spring to rotate in the winding direction, whereas, when the torsion spring does not engage the shaft, the drum 236 is free to rotate in the unwinding direction.

The second carriage 230 may carry a pulley 240, as shown, such that the pulley 240 travels upward and downward together with the second carriage 230. A cable 242 is operatively engaged with the pulley 240. A first end 244 of the cable 242 comprises a clasp 248, lock, latch, or other actuatable securing member, hereinafter referred to as clasp 248. An opposite, second end 246 of the cable 242 is connected to a spool, wheel, or other rotatable structure, hereinafter referred to as spool 250, which is configured to rotate a shaft 252. The spool 250 and shaft 252 may be operable to selectively engage (or lock) with one another such that they are jointly rotatable, or disengage from one another such that the spool 250 may rotate independently from the shaft 252. In the disengaged configuration, the spool 250 may be spring-biased (e.g., by a torsion spring) to rotate in a winding direction for winding the cable 242 thereon.

With continued reference to FIG. 1, a control unit 260 may operatively interface with the actuatable clasps 138, 198, 248 to remotely control opening and closing of the clasps 130, 198, 248. For instance, each actuatable clasp 138, 198, 248 may be electrically-operated by a corresponding electric motor, which may be remotely controlled by the control unit 260. The control unit 260 may include at least one processor and a memory storing software instructions configured to cause the processor to operate the system 100 in accordance with the methods described herein. The control unit 260 may further include a user interface 262, allowing a user to operate the control unit 260, program the control unit 260, and/or otherwise interface with the control unit 260. Electrical power may be supplied to the control unit 260 by an internal power source (e.g., one or more rechargeable or replaceable batteries) and/or an external power source (e.g., a power grid).

As will be described in greater detail hereinafter, the system 100 is configured to cyclically circulate a weight or body 270 through the system, such that the body 270 acquires potential energy at least partially due to a buoyancy of the body 270, and further such that the potential energy of the body 270 is at least partially used to rotate the shaft 252. In this way, natural buoyancy of the body 270 is used to generate kinetic (rotational) energy at shaft 252, which can then be used to generate electricity or for other purposes.

The body 270 is thus a weight that can float. The illustration of FIG. 1 shows the body 270 in two different positions, denoted with reference numerals 270 and 270', respectively, which will be used later in this description to describe a sequence of operation of the system 100. In some embodiments, the body 270 may include three parts, consisting of a bottom part 272, a top part 274, and ring 278. The bottom part 272 may be made of a dense material, such as, but not limited to, metal (e.g., stainless steel). The top part 274 may be a hollow vessel, made for instance of plastic, which provides buoyancy to the body 270. The ring 278 may be arranged at the top of the body 270, i.e. at the top part 274, and may assist in lifting the body 270 as will be described hereinafter.

An illustrative method of converting potential energy of the body 270 to kinetic energy at shaft 252 is now described in detail with reference to FIGS. 1-6, which show a cycle of operation of the system 100. Referring initially to FIG. 1, the first and second valves 158 and 160 of the buoyant tube 156 may be arranged in a closed position, and the water column 150 may remain above the second valve 160, with the top end 152 of the water column 150 located well above water surface level 104, and more specifically, at or near the top end 162 of the buoyant tube 156. The water column 150 may also extend between the first and second valves 158 and 160, and below the first valve 158 down to the bottom end 154 of the water column 150, which is arranged at the bottom end 164 of the buoyancy tube 156. The closed, first and second valves 158 and 160 facilitate maintaining the water column 150 as described, i.e. prevent the water column 150 from falling to water surface level 104. Should a need arise to supply additional water to the buoyancy tube 156 to maintain the water column 150 in this refilled condition, a water source (e.g., hose) may be positioned at the open, top end 162 of the buoyancy tube 156 and water may be fed to the through bore 166 of the buoyancy tube 156 through the top end 162.

As further shown, the lifting mechanism 170 may be arranged in a first configuration in which the inflatable body 176 of the weight assembly 172 is inflated and the weight assembly 172 is thereby positioned at the water surface level 104. Consequently, the cable 180, via the set of pulleys 190, is advanced towards the buoyancy tube 156, and the second end 184 of the cable 184, and corresponding clasp 198, are advanced downward and located over and adjacent to the top end 162 of the buoyancy tube 156. The valve 214 of the lifting mechanism 170 is operated to maintain the inflatable body 176 inflated (for example, the valve 214 does not allow air to vent from the inflatable body 176 at this time).

In addition, the first and second carriages 130 are positioned at the top end 122 of the first rail system 120 and the bottom end 224 of the second rail system 220, respectively, such that the second carriage 230 and the pulley 240 are arranged generally over the first carriage 130. The spring-loaded drum 136 maintains the cable 134 taut and the first carriage 130 in this topmost position. The clasp 138 of the first carriage 130 may be arranged in an open position, as shown. The body 270, the first end 244 of the cable 242, and the clasp 248 are arranged in an elevated position, with the body 270 (shown in solid lines) suspended from the first end 244 of the cable 242 by a coupling of the clasp 248 with the ring 278 of the body 270. In this position, the elevated body 270 conserves an amount of potential energy and is thus "replenished". In a non-limiting example, the elevated body 270 may be located a height above the generator (spool 250 and shaft 252), which in turn may be located at or near ground level.

Figure 2:
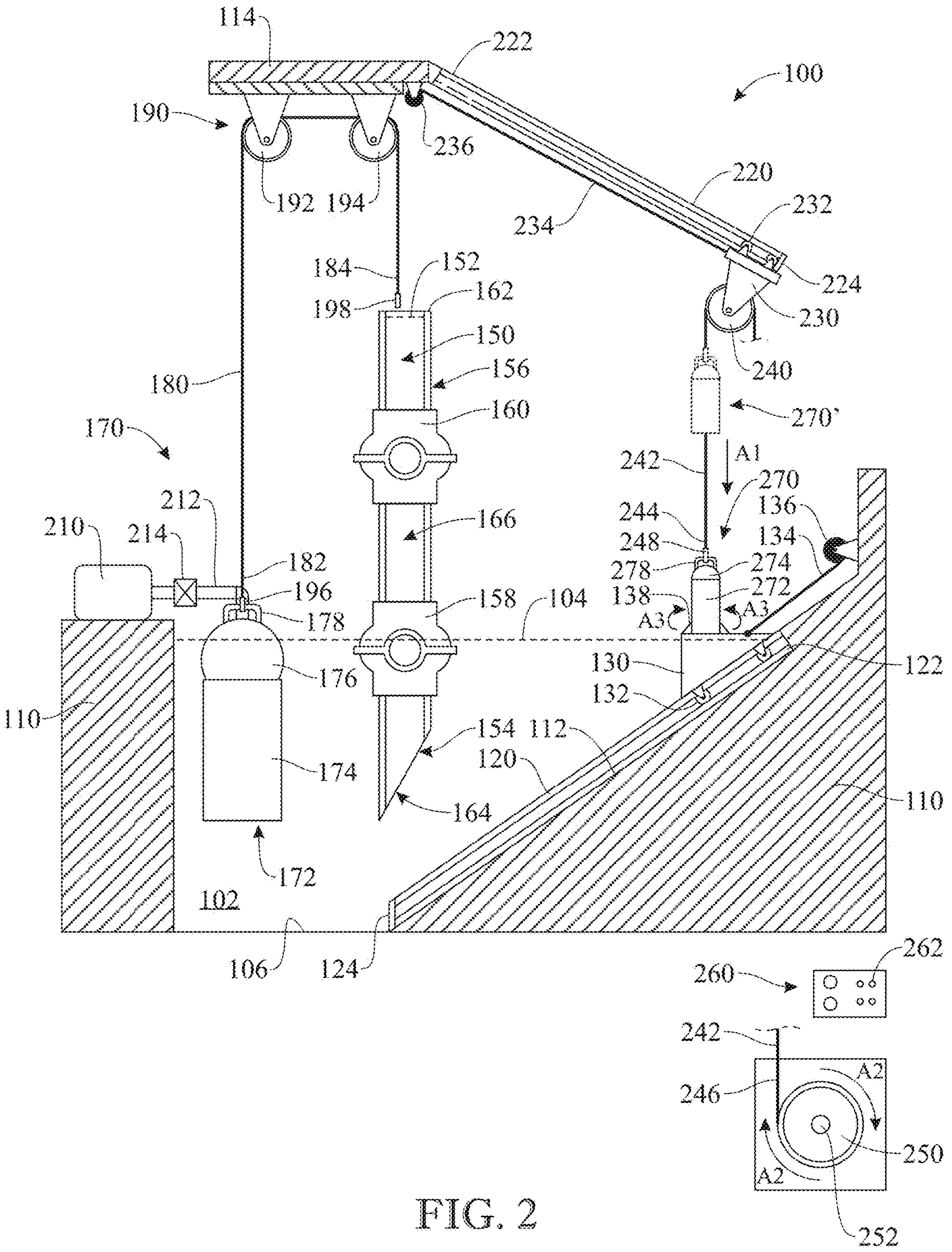
FIG. 2 presents the system of FIG. 1, the view showing a second phase of the illustrative method.

Turning to FIG. 2, once the body is arranged in the elevated position, shown in phantom lines and indicated now with reference numeral 270', the spool 250 is engaged with the shaft 252, and the body 270' and cable 242 are allowed to fall due to gravity, as indicated by arrow A1. As the body 270' falls, the body 270' pulls on the first end 244 of the cable 242, and the cable 242 is pulled downward along the pulley 240. As a consequence of displacing the cable 242, the second end 246 of the cable 242 exerts a pulling force on the spool 250, which causes the spool 250 and shaft 252 to jointly rotate as indicated by arrows A2. The falling body 270' therefore turns the generator shaft 252, thereby transforming potential energy of the body 270' into kinetic energy at the shaft 252. The kinetic energy may then be used to generate electricity, movement, or for any other applicable use.

Eventually, as shown in solid lines and indicated with reference numeral 270, the body 270 lands on the first carriage 130. Once the body 270 has landed on the first carriage 130, the clasp 138 of the first carriage 130 may switch from the open position (FIG. 1) to the closed position (FIG. 2), as indicated by arrows A3, to secure the body 270 to the first carriage 130. The clasp 248 may then be actuated to switch to an open or unclasped position in which the ring 278 of the body 270 is freed from the clasp 248.

Figure 3:
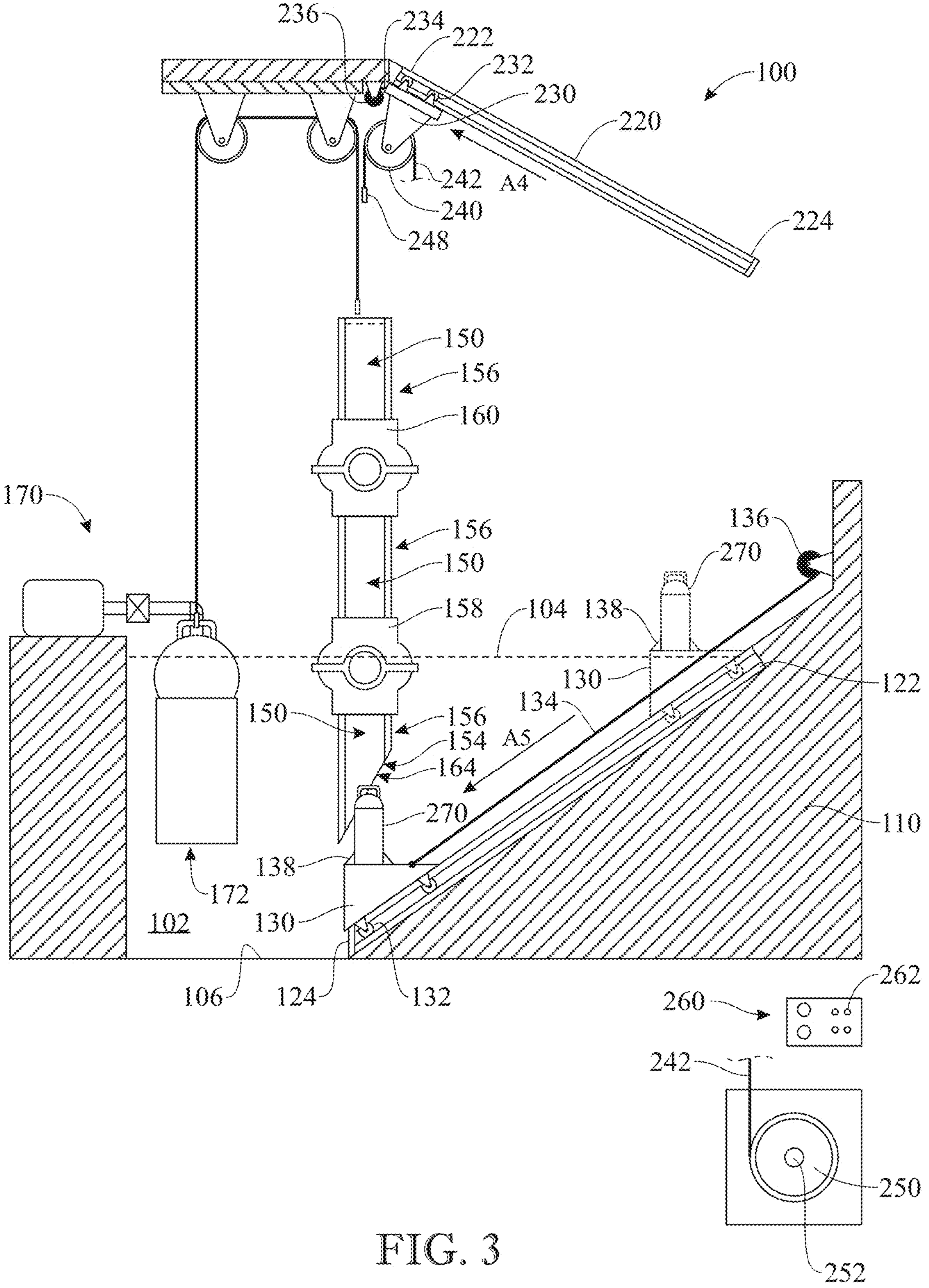
FIG. 3 presents the system of FIG. 1, the view showing a third phase of the illustrative method.

With reference to FIG. 3, once the body 270 (now shown in phantom lines) is arranged on the first carriage 130 and locked in place, the spool 250 is unlocked from the generator shaft 252, and a torsion spring at the spool 250 retracts the cable 242 to raise the clasp 248 back to the elevated position adjacent to the pulley 240. Once the clasp 248 is again arranged in the elevated position, the spool 250 locks back on the generator shaft 252 and the spool 250 and shaft 252 are prepared for the next drop. Additionally, the torsion spring at drum 236 is engaged with the drum 236, causing the drum 236 to automatically wind the cable 234 thereonto and pull the second carriage 230 upward along the second rail system 220, as indicated by arrow A4, until the second carriage 230 teaches the topmost position at the top end 222 of the second rail system 220, as shown.

Furthermore, once the body 270 is locked to the first carriage 130, the torsion spring at the drum 136 is released and the drum 136 is thereby freed to rotate in an unwinding direction. In consequence, the weight of the first carriage 130 pulling downward on the cable 134 causes the cable 134 to unwind from the drum 136, allowing the first carriage 130 to travel downward along the first rail system 120. Since the body 270 is attached to the first carriage 130, the body 270 travels jointly with the first carriage 130, as indicated by arrow A5. Furthermore, The weight of the first carriage 130 is sufficient to drag the body 270 underwater. The freed, first carriage 130 and the body 270 locked thereonto are able to travel downward along the first rail system 120 and underwater due to gravity, from the topmost position (shown in phantom lines) at the top end 122 of the first rail system 120 to the bottommost position (shown in solid lines) at the bottom end 124 of the first rail system 120. In some embodiments, the bottom end 124 of the first rail system 120 may serve as a stop or block, which automatically stops the first carriage 130 at the bottom end 124.

Figure 4:
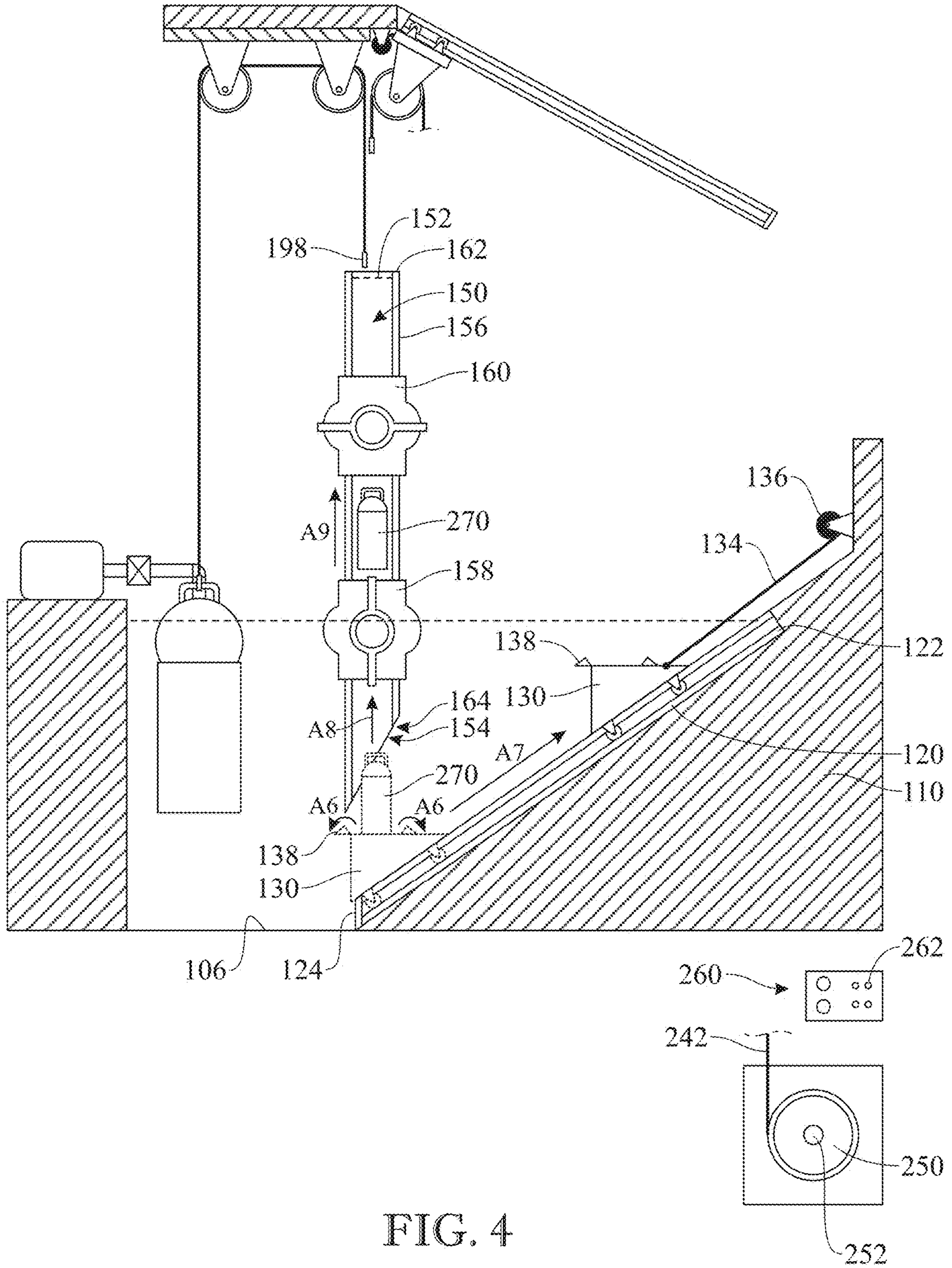
FIG. 4 presents the system of FIG. 1, the view showing a fourth phase of the illustrative method.

Referring now to FIG. 4, when the first carriage 130 and the body 270 have reached the bottom end of the first rail system 120, as shown in this figure in phantom lines, the body 270 faces the open, bottom end 164 of the buoyancy tube 156. Once the body 270 has reached such a position below the buoyancy tube 156, the clasp 138 of the first carriage 130 switches to an open or unlocked position as indicated by arrows A6, disengaging the body 270, and the body 270 is free to rise due to its buoyancy. In turn, the torsion spring at drum 136 is engaged with the drum 136, causing the drum 136 to automatically wind the cable 134 thereonto and start pulling the first carriage 130 upward along the first rail system 120, as indicated by arrow A7.

The body 270, once freed from the first carriage 130, begins ascending through the water column 150 contained within the through bore 166 of the buoyancy tube 156 (the through bore 166 being wider than the body 270), as indicated by arrow A8. I.e., when released from the first carriage 130, the body 270 floats up through the buoyancy tube 156. When the body 270 nears the first valve 158, the first valve 158 switches to an open position (shown in FIG. 4) allowing the body 270 (as shown in solid lines) to overcome or pass through the first valve 158 and further progress upward through the water column 150, as indicated by arrow A9. Once the body 270 passes through the first valve 158, the first valve 158 switches to a closed position, as shown in FIG. 5, preventing water from the water column 150 above the first valve 158 from descending through the first valve 158.

Figure 5:
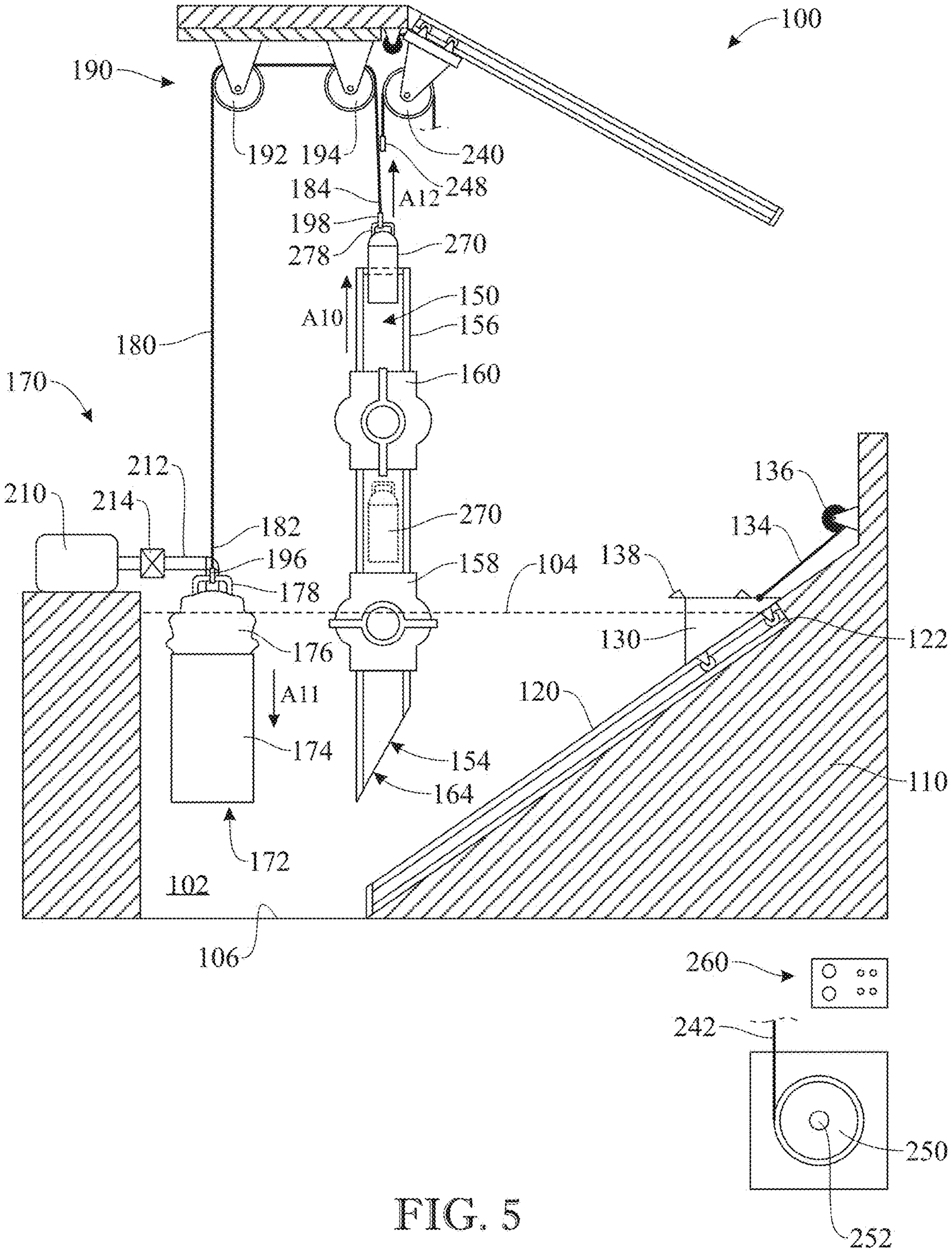
FIG. 5 presents the system of FIG. 1, the view showing a fifth phase of the illustrative method.

Referring now to FIG. 5, as shown, once the body 270 (now shown in phantom lines) nears the second valve 160, the second valve 160 switches to an open position allowing the body 270 to overcome the second valve 160 and further progress upward through the water column 150, as indicated by arrow A10. Once the body 270 passes through the second valve 160, the second valve 160 switches to a closed position (FIG. 6), preventing water from the water column 150 above the second valve 160 from descending through the second valve 160. With continued reference to FIG. 5, the body 270 continues its upward ascent until it reaches the top end 152 of the water column 150 at the open, top end 162 of the buoyancy tube 156 (the body 270 having been depicted in solid lines at this point).

Once the body 270 is positioned at the open, top end 162 of the buoyancy tube 156, the clasp 198 at the second end 184 of the cable 180 of the lifting mechanism 170 may be operated to lock or clasp onto the ring 278 of the body 270. Next, the valve 214 of the lifting mechanism 170 may be operated to allow air to vent from the inflatable body 176, causing the inflatable body 176 of the weight assembly 172 to deflate, as shown. As the inflatable body 176 deflates, the weight 174 of the weight assembly 172 is able to counteract the remaining (if any) floatability of the inflatable body 176 and cause the overall weight assembly 172 to start sinking within the body of water 102, as indicated by arrow A11. The sinking weight assembly 172 exerts a downward pulling force on the first end 182 of the cable 180, which is transmitted through the set of pulleys 190 such that an upward pulling force is exerted on the clasp 198 by the second end 184 of the cable 180. As a result, the lifting mechanism 170 begins lifting the body 270 upward from the buoyancy tube 156, as indicated by arrow A12.

Figure 6:
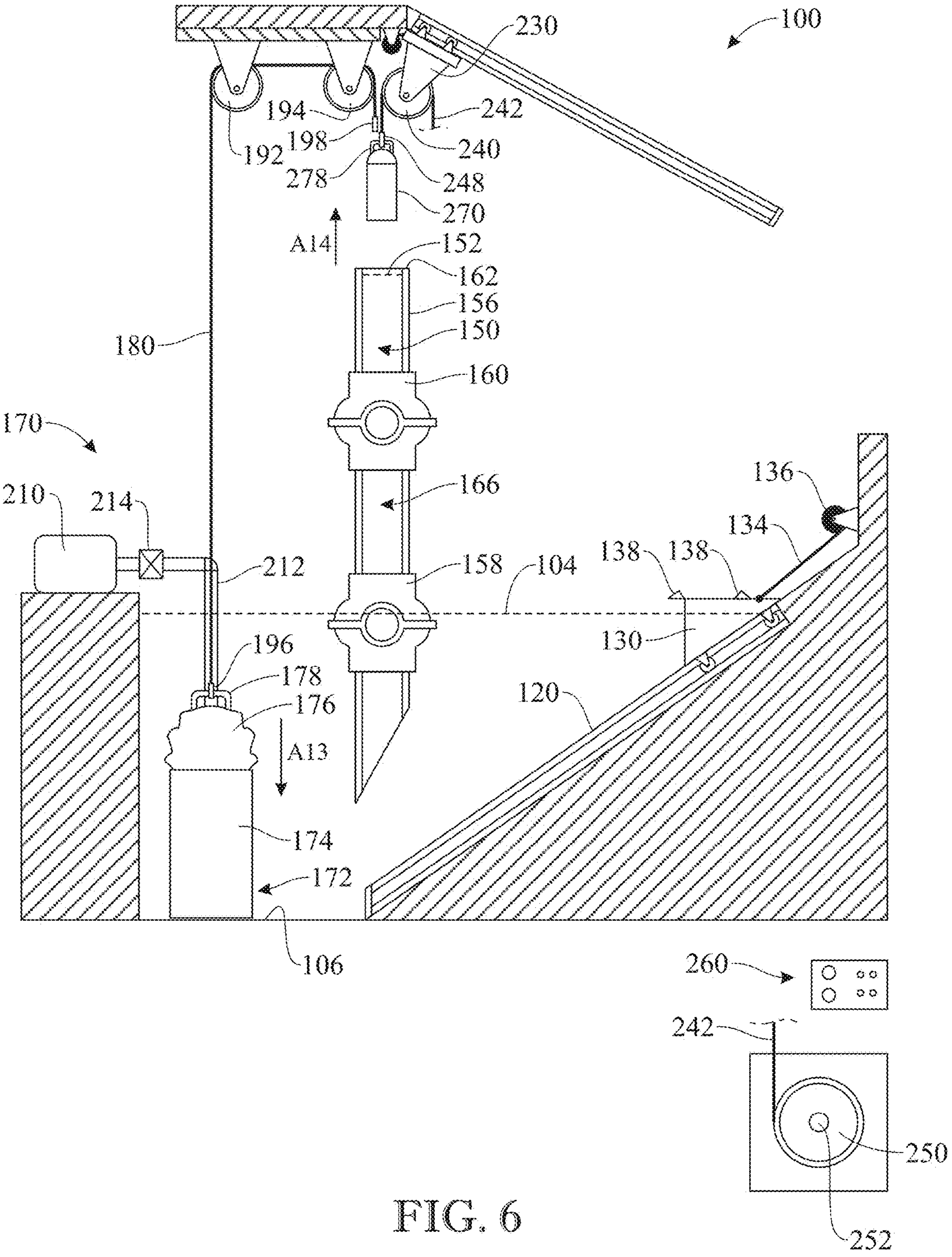
FIG. 6 presents the system of FIG. 1, the view showing a sixth phase of the illustrative method.

Referring now to FIG. 6, continued sinking of the weight assembly 172 within the body of water 102, indicated by arrow A13, causes the body 270 to continue rising, as indicated by arrow A14. Eventually, the weight assembly 172 reaches a bottommost position, such as adjacent to, and more preferably on, the floor 106 of the body of water 102. Correspondingly, the body 270 reaches a topmost position, shown in the figure, in which the body 270 is entirely extracted from the buoyancy tube 156. Once the lifting mechanism 170 has finished lifting the body 270 out of the buoyancy tube 156, the clasp 248 of the cable 242 is operated to lock or clasp the ring 278 of the body 270, and the clasp 198 of the cable 180 of the lifting mechanism 170 is then operated to unlock, unclasp, or release the ring 278. In this way, the body 270 may be "handed over" from the lifting mechanism 170 to the pulley 240 and associated cable 242, such that the body 270 is now suspended from the cable 242.

Referring back to FIG. 1, the "handed over" body, shown in phantom lines and indicated with reference numeral 270', is now suspended from cable 242 and has been fully "replenished" with potential energy with the assistance of the buoyancy tube 156 as heretofore described. Next, the torsion spring at drum 236 may be disengaged from the drum 236, allowing the drum 236 to rotate freely and the cable 234 to unwind from the drum 236. In consequence, the second carriage 230 is freed to travel downward along the second rail system 220 due to gravity, as indicated by arrow A15, thereby hoisting the body 270 away from the buoyancy tube 156 with the assistance of gravity. Eventually, the second carriage 230 reaches its bottommost position at the bottom end 224 of the second rail system 220. In some embodiments, the bottom end 224 of the second rail system 220 may serve as a stop or block, which automatically stops the second carriage 230 at said bottom end 224. In this bottommost position, in which the second carriage 230 and body 270 are shown in solid lines, the body 270 is horizontally spaced apart from the buoyancy tube 156 and yet preserves most of its potential energy, and is prepared to begin a new cycle of operation. In turn, the compressed air source 210 has been actuated to inject pressurized air into the inflatable body 176 of the weight assembly 172, causing the weight assembly 172 to float and rise to its highest position, which in turn causes the second end 184 of the cable 180 and the corresponding clasp 198 to descend to their lowest position, adjacent to the open, top end 162 of the buoyancy tube 156, in preparation for the new cycle of operation.

In some embodiments, one or more internal or external power sources may be used to actuate various energy-consuming mechanisms described herein. For example, the actuatable clasps 138, 196, 198, 248 may be electrically operated. The respective torsion spring at each drum 136, 236 may be electrically operated or repositioned to selectively engage and disengage with the corresponding drum 136, 236 as heretofore described. Similarly, the spool 250 and shaft 252 may be electrically operated to selectively engage or disengage as heretofore described. The valves 158, 160, 214 may be electrically operable (e.g., solenoid valves) between the various positions heretofore described. The water column 150 may be refilled with water by means of a refill pump, which may be electrically operated in some embodiments. The compressed air source 210 may be electrically- or pneumatically-operated. Further energy replenishments may apply without departing from the scope of the present disclosure.

Furthermore, in some embodiments, the timing of the various steps of the method may be fixed, such as programmed at, and controlled by, the control unit 260. For example, the control unit 260 may remotely communicate with, and control, operation of the actuatable clasps 138, 196, 198, 248, torsion springs at drums 136, 236, the spool 250 and shaft 252, the refill pump, and/or the valves 158, 160, 214, the compressed air source 210. Alternatively or additionally, the system 100 may include a plurality of sensors configured to sense the position of movable elements such as the body 270, the weight assembly 172, the first carriage 130, and/or the second carriage 230, to facilitate or responsively adjust the timing of each step.

Alternative embodiments are contemplated without departing from the scope of the present disclosure. For instance, in some embodiments, the drums 136, 236 and spool 250, which have been described as being spring-loaded, may alternatively or additionally be assisted by a servo motor or other automated mechanism to operate as described with respect to the spring-loading action. In other embodiments, the first carriage 130 may include one or more inflatable bladders which may be selectively inflated by an air compressor to facilitate upward traveling of the first carriage 130 along the first rail system 120.

In summary, the present system and method involve a cyclical procedure in which potential energy of a buoyant body falling through air is converted into kinetic energy, after which the body is allowed to float upward through water to increase or "replenish" its potential energy and thereafter repeat the cycle. This cyclical process may be carried out using a relatively small amount of input energy. The invention provides a safe and reliable solution for producing renewable energy that has low environmental impact. The system and method of the present invention take advantage of unlimited energy sources (gravity and buoyancy) and thus minimize energy consumption required from additional/external sources (e.g., electricity, solar energy, fuel, etc.) to operate the system.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A system for converting potential energy into kinetic energy, comprising:

a water body, comprising a water surface level;

a water column, comprising a bottom end arranged within the water body and a top end arranged above the water surface level;

a buoyant body, shaped and sized to float through the water column from the bottom end of the water column to the top end of the water column to acquire potential energy;

a hoist mechanism, configured to seize the buoyant body at a first position at or near the top end of the water column, and to transport the seized, buoyant body from the first position to a second position away from the water column, and to allow the buoyant body to fall from said second position to a third position due to gravity;

a cable, configured to transmit a force exerted thereon by the buoyant body falling from said second position to said third position;

a generator shaft, operatively engaged with said cable such that the generator shaft is rotatable by said force transmitted by said cable; and a transport mechanism, configured to engage the buoyant body and displace the engaged, buoyant body from the third position to the bottom end of the water column, and further configured to disengage the buoyant body at said bottom end of the water column to release said buoyant body into said water column through said bottom end, wherein the transport mechanism is configured to transport the engaged, buoyant body from the third position to the bottom end of the water column by gravity.

2. The system of claim 1, further comprising:

a structure defining boundaries of the water body; and a buoyancy tube containing the water column, the buoyancy tube secured in place with respect to the structure.

3. The system of claim 1, comprising at least one valve arranged along the water column, wherein each valve of the at least one valve is selectively arrangeable in an open position allowing the buoyant body to flow upward therethrough and a closed position preventing water from flowing downward therethrough.

4. The system of claim 1, wherein the second position is arranged horizontally spaced apart from the first position.

5. The system of claim 4, wherein the second position is arranged vertically lower than the first position.

6. The system of claim 1, wherein the bottom end of the water column is arranged vertically lower than the third position.

7. The system of claim 1, wherein the hoist mechanism is configured to transport the seized, buoyant body from the first position to the second position by gravity.

8. The system of claim 1, wherein the hoist mechanism is configured to unseize the buoyant body in the second position.

9. The system of claim 1, wherein the hoist mechanism is automatically arrangeable in the first position when not seizing the buoyant body.

10. The system of claim 1, wherein the transport mechanism is configured to disengage from the buoyant body at the bottom end of the water column.

11. The system of claim 1, wherein the transport mechanism is automatically arrangeable in the third position when not engaging the buoyant body.

12. The system of claim 1, further comprising a lifting mechanism configured to lift the buoyant body out of the water column and to the first position.

13. A method for converting potential energy into kinetic energy, comprising the steps of:

a) providing a system comprising:

a water body, comprising a water surface level, a water column, comprising a bottom end arranged within the water body and a top end arranged above the water surface level, a buoyant body, shaped and sized to float through the water column from the bottom end of the water column to the top end of the water column, a hoist mechanism, configured to selectively engage and disengage the buoyant body, a cable, a generator shaft, and a transport mechanism, configured to selectively engage and disengage the buoyant body;

b) allowing the buoyant body to float through the water column from the bottom end of the water column to the top end of the water column to acquire potential energy;

c) engaging the hoist mechanism to the buoyant body at a first position at or near the top end of the water column;

d) transporting the buoyant body, using the hoist mechanism, from the first position to a second position away from the water column;

e) allowing the buoyant body to fall from said second position to a third position due to gravity with the cable connected to the buoyant body such that a pulling force is exerted by the buoyant body on the cable;

f) transmitting at least part of said pulling force to the generator shaft via the cable, thereby causing the generator shaft to rotate;

g) disengaging the hoist mechanism from the buoyant body at the third position;

h) engaging the transport mechanism to the buoyant body at the third position;

i) carrying the buoyant body, by the transport mechanism, from the third position to the bottom end of the water column, wherein the step of carrying the buoyant body comprises displacing the transport mechanism by gravity;

j) disengaging the buoyant body from the transport mechanism at the bottom end of the water column;

k) allowing the buoyant body to enter the column of water through the bottom end; and l) cyclically repeating steps a) through k).

14. The method of claim 13, further comprising the step of:

after step g) and prior to subsequent step c), automatically displacing the hoist mechanism back to the first position.

15. The method of claim 13, further comprising the step of:

after step j) and prior to subsequent step h), automatically displacing the transport mechanism back to the third position.

16. The method of claim 13, wherein the step of transporting the buoyant body comprises displacing the hoist mechanism by gravity.

17. The method of claim 13, further comprising the step of:

between step b) and subsequent step c), lifting the buoyant body out of the water column and to the first position.

18. A method for converting potential energy into kinetic energy, comprising the steps of:

a) providing a system comprising:

a water body, comprising a water surface level, a water column, comprising a bottom end arranged within the water body and a top end arranged above the water surface level, a buoyant body, shaped and sized to float through the water column from the bottom end of the water column to the top end of the water column, a hoist mechanism, configured to selectively engage and disengage the buoyant body, a cable, a generator shaft, and a transport mechanism, configured to selectively engage and disengage the buoyant body;

b) allowing the buoyant body to float through the water column from the bottom end of the water column to the top end of the water column to acquire potential energy;

c) engaging the hoist mechanism to the buoyant body at a first position at or near the top end of the water column;

d) transporting the buoyant body, using the hoist mechanism and by gravity, from the first position to a second position away from the water column, the second position arranged lower than the first position;

e) allowing the buoyant body to fall from said second position to a third position due to gravity with the cable connected to the buoyant body such that a pulling force is exerted by the buoyant body on the cable;

f) transmitting at least part of said pulling force to the generator shaft via the cable, thereby causing the generator shaft to rotate;

g) disengaging the hoist mechanism from the buoyant body at the third position;

h) engaging the transport mechanism to the buoyant body at the third position;

i) carrying the buoyant body, by the transport mechanism and by gravity, from the third position to the bottom end of the water column, the bottom end arranged lower than the third position;

j) disengaging the buoyant body from the transport mechanism at the bottom end of the water column;

k) allowing the buoyant body to enter the column of water through the bottom end; and l) cyclically repeating steps a) through k).

* * * * *